United States Patent
Kaeufl et al.

(10) Patent No.: US 6,873,076 B2
(45) Date of Patent: Mar. 29, 2005

(54) ELECTRIC DRIVE UNIT CONSISTING OF AN ELECTROMOTOR AND AN ELECTRONIC MODULE

(75) Inventors: Georg Kaeufl, Maierhofen (DE); Johann Schneider, Wettstetten (DE); Klaus Spreng, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 173 days.

(21) Appl. No.: 10/203,693

(22) PCT Filed: Jan. 18, 2001

(86) PCT No.: PCT/EP01/00535
§ 371 (c)(1),
(2), (4) Date: Aug. 12, 2002

(87) PCT Pub. No.: WO01/59915
PCT Pub. Date: Aug. 16, 2001

(65) Prior Publication Data
US 2003/0001448 A1 Jan. 2, 2003

(30) Foreign Application Priority Data
Feb. 12, 2000 (DE) .......................... 100 06 320

(51) Int. Cl.[7] .............................................. H02K 11/00
(52) U.S. Cl. .................. 310/91; 310/68 R; 310/71; 310/83; 310/89; 310/233; 310/239; 310/249
(58) Field of Search ................. 310/68 R, 71, 310/83, 89, 233, 239, 248, 249

(56) References Cited

U.S. PATENT DOCUMENTS

| | | | |
|---|---|---|---|
| 4,398,135 A | * | 8/1983 | Busch et al. ............... 318/443 |
| 4,572,979 A | * | 2/1986 | Haar et al. ................ 310/68 R |
| 4,614,886 A | * | 9/1986 | Schneider et al. ............ 310/83 |
| 4,857,812 A | * | 8/1989 | Mochizuki et al. ........... 318/15 |
| 4,978,877 A | * | 12/1990 | Quirijnen ................... 310/239 |
| 5,013,952 A | * | 5/1991 | Sekine et al. ............... 310/239 |
| 5,528,093 A | * | 6/1996 | Adam et al. .................. 310/89 |
| 5,691,585 A | * | 11/1997 | Shoda ........................ 310/71 |
| 5,747,911 A | * | 5/1998 | Kikly ........................ 310/239 |
| 5,889,378 A | | 3/1999 | Hayashi |
| 5,942,819 A | * | 8/1999 | Burgess et al. ............... 310/51 |
| 6,019,292 A | | 2/2000 | Walther |
| 6,043,576 A | | 3/2000 | Weber et al. |
| 6,099,324 A | | 8/2000 | Janssen et al. |
| 6,175,171 B1 | | 1/2001 | Rupp et al. |
| 6,201,326 B1 | | 3/2001 | Klappenbach et al. |

FOREIGN PATENT DOCUMENTS

| | | |
|---|---|---|
| DE | 4005709 | 9/1991 |
| DE | 4233156 | 4/1994 |
| DE | 4315404 | 11/1994 |
| DE | 19548867 | 1/1997 |
| DE | 19704472 | 8/1998 |
| DE | 19723280 | 12/1998 |
| DE | 19727165 | 1/1999 |
| DE | 19832561 | 1/1999 |
| DE | 19805185 | 8/1999 |
| EP | 0474904 A1 | * 12/1990 |
| EP | 0538495 | 4/1993 |
| GB | 2289351 | 11/1995 |
| JP | 9131034 | * 5/1997 |

* cited by examiner

Primary Examiner—Darren Schuberg
Assistant Examiner—David W. Scheuermann
(74) Attorney, Agent, or Firm—W. F. Fasse; W. G. Fasse

(57) ABSTRACT

An electric drive unit provides a simple and economical electrical connection of an electric motor and an electronic module. The commutator of the electric motor, a brush rocker ring arranged on the commutator, and the drive shaft of the electric motor as well as the carrier body of the electronic module are inserted into a transmission housing. In the transmission housing, the carrier body of the electronic module is positioned so that contact elements provided on the brush rocker ring engage into contact points provided on the carrier body of the electronic module. The electric drive unit can be used for window lifter drives.

11 Claims, 2 Drawing Sheets

ELECTRIC DRIVE UNIT CONSISTING OF AN ELECTROMOTOR AND AN ELECTRONIC MODULE

BACKGROUND INFORMATION

Electric drive units are used in diverse application fields; for example in the motor vehicle field, various movable parts of the motor vehicle (seats, window lifters, sliding sunroofs, etc.,) are operated by means of electric drive units. Electric drive units consist of an electromotor (i.e. electric motor) (for example a direct current motor) for generating and providing electrical drive power, and of an electronic module for controlling/driving and monitoring the electric motor (for example for the rotational speed and power regulation of the electric motor), as well as for the realization of additional functions, as the case may be. For carrying out the movement of the drive shaft of the electric motor, there is provided a transmission arranged in a transmission housing, and the electric motor is connected in a suitable manner with the transmission. An electrical connection is required between the electronic module and the electric motor for further conveying sensor signals and control signals, as well as for the voltage supply. In connection with a direct current motor as the electric motor, for this purpose, the collector or commutator of the electric motor is connected with the electronic module, which is arranged on a carrier body (for example a circuit board). Typically, the electrical connection is realized via connection lines embodied as a cable, which connection lines are connected by means of connector plugs to the plug connections on the electronic module housing and the electric motor housing.

In this context it is disadvantageous that this connection between electric motor and electronic module is complicated and costly, and gives rise to problems with respect to reliability, aging, etc., and necessitates a high surface area requirement, so that the installation volume of the electric drive unit is large and the production of the electric drive unit is connected with relatively high costs.

SUMMARY OF THE INVENTION

The object underlying the invention is to propose an electric drive unit that comprises advantageous characteristics in comparison to the above, especially a simple construction and low costs, a high reliability, and a simplified manufacturing.

This object is achieved according to the invention electric drive unit comprising an electric motor, an electronic module, and a transmission, wherein a commutator, a brush rocker ring arranged on and extending circumferentially around the commutator, and a drive shaft of the electric motor, as well as a carrier body of the electronic module are inserted into a transmission housing and wherein an electrical connection between the electric motor and the electronic module is achieved in the transmission housing via contact elements which are fixedly arranged on the brush rocker ring and which releasably engage into contact points fixedly provided on the carrier body of the electronic module.

Electric motor and electronic module form a drive unit that is integrated in or with the transmission housing, especially the electrical connection between electric motor and electronic module is realized in the transmission housing via contact elements (for example press-in contacts) arranged on the brush rocker or bridge, whereby the contact elements engage into corresponding contact points on the carrier body of the electronic module (for example into through-contacts of a circuit board). For contacting the electric motor, two contact elements (press-in contacts) are required on the commutator of the electric motor, and therewith on the brush rocker, and consequently two corresponding contact points are required on the carrier body; however, more contact elements (press-in contacts) may also be provided on the brush rocker and therewith also more corresponding contact points can be provided on the carrier body, whereby number and arrangement of the press-in contacts on the brush rocker and therewith also number and arrangement of the corresponding contact points on the carrier body are selected dependent on the characteristics of the electric drive unit, especially dependent on the current requirement of the electric drive unit or the required current carrying capacity.

Recesses for the electric motor and the electronic module are provided in the transmission housing on its front side (end face side), especially, a first recess is provided for the drive shaft, the commutator, and the brush rocker of the electric motor, and a second recess is provided for the connection part of the electronic module comprising connector plug contacts. Drive shaft, commutator, and brush rocker of the electric motor are inserted into the first recess in the transmission housing in such a manner, so that the electric motor housing which encloses the rotor (armature) of the electric motor lies flushly on the transmission housing. The electronic module is introduced into the transmission housing from the upper side of the transmission housing, whereby the connector part of the electronic module is inserted into the second recess in the transmission housing and the carrier body of the electronic module, with the aid of guides applied on the interior wall of the transmission housing, is positioned in such a manner, so that the carrier body is arranged parallel to the bottom side (to the base surface or to the floor) of the transmission housing and thereby its upper surface normal vector or axis extends perpendicularly (at an angle of 90°) relative to the axis of the drive shaft of the electric motor and the contact points on the carrier body of the electronic module come to rest on the contact elements (press-in contacts) arranged on the brush rocker. By the application of pressure, for example by means of a press, the contact elements (press-in contacts) are connected with the contact points (for example the press-in contacts are pressed into the through-contacts of a circuit board), whereby electric motor and electronic module are electrically connected with one another. For protection against environmental influences or for stability reasons, a housing part (embodied as a lid of the transmission housing) can be arranged as the upper or top side of the transmission housing and hereby a closed transmission housing can be realized. The securing of the electric motor housing on the transmission housing, and therewith the mechanical connection between electric motor and transmission (transmission housing) is achieved by means of suitable securing elements, for example via screws inserted into corresponding bored holes in the electric motor housing and transmission housing.

In the electronic module, there can be arranged several functional units arranged on the circuit carrier in a compact construction: for example a power unit with power semiconductor components, a control/driving unit, an anti-interference unit for suppressing the effects of the commutation processes of the electric motor (brush arcing) as well as the connector part with the connector plug contacts. Preferably the electronic module comprises at least one rotation speed sensor (for example a Hall sensor) for detecting the rotational speed of the electric motor, which sensor can be positioned at (any desired) suitable place on the carrier body; especially the rotation speed sensor is positioned on the carrier body in such a manner so that a sufficient coupling is provided to a transmitter or emitter applied on the drive shaft of the electric motor, for example a sufficient magnetic coupling of a Hall sensor to an emitter magnet applied on the drive shaft of the electric motor. The dimensioning of the carrier body (of the circuit board) is guided by the number of the components of the electronic module, and can be optimized in accordance with the surface area required therefor.

Due to the realization of a very short internal electrical connection between electric motor and electronic module, separate connection lines are omitted, and also the problems connected herewith (space requirement, reliability, costs, etc.); therefore, in the integration of electric motor and electronic module in a compact electric drive unit, only small installation volumes are necessary and good electrical characteristics, a high reliability and a high operating life are ensured.

BRIEF DESCRIPTION OF THE DRAWINGS

In connection with the drawing (FIGS. 1 and 2) the electric drive unit shall be described in connection with an example embodiment.

DETAILED DESCRIPTION OF A PREFERRED EXAMPLE EMBODIMENT OF THE INVENTION

Figure 1:
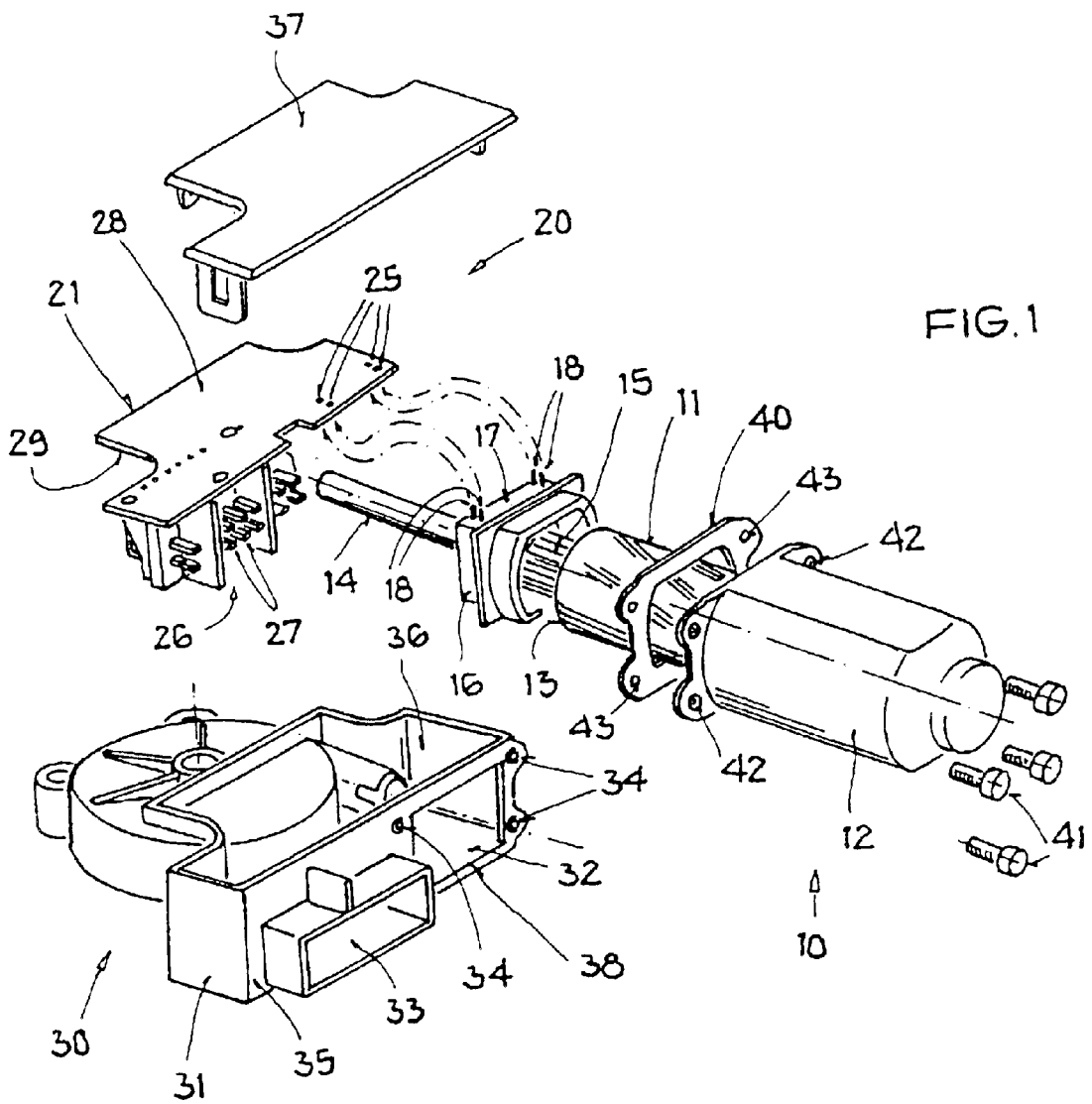
FIG. 1 shows a three-dimensional view of the electric drive unit with the individual components.
Figure 2:
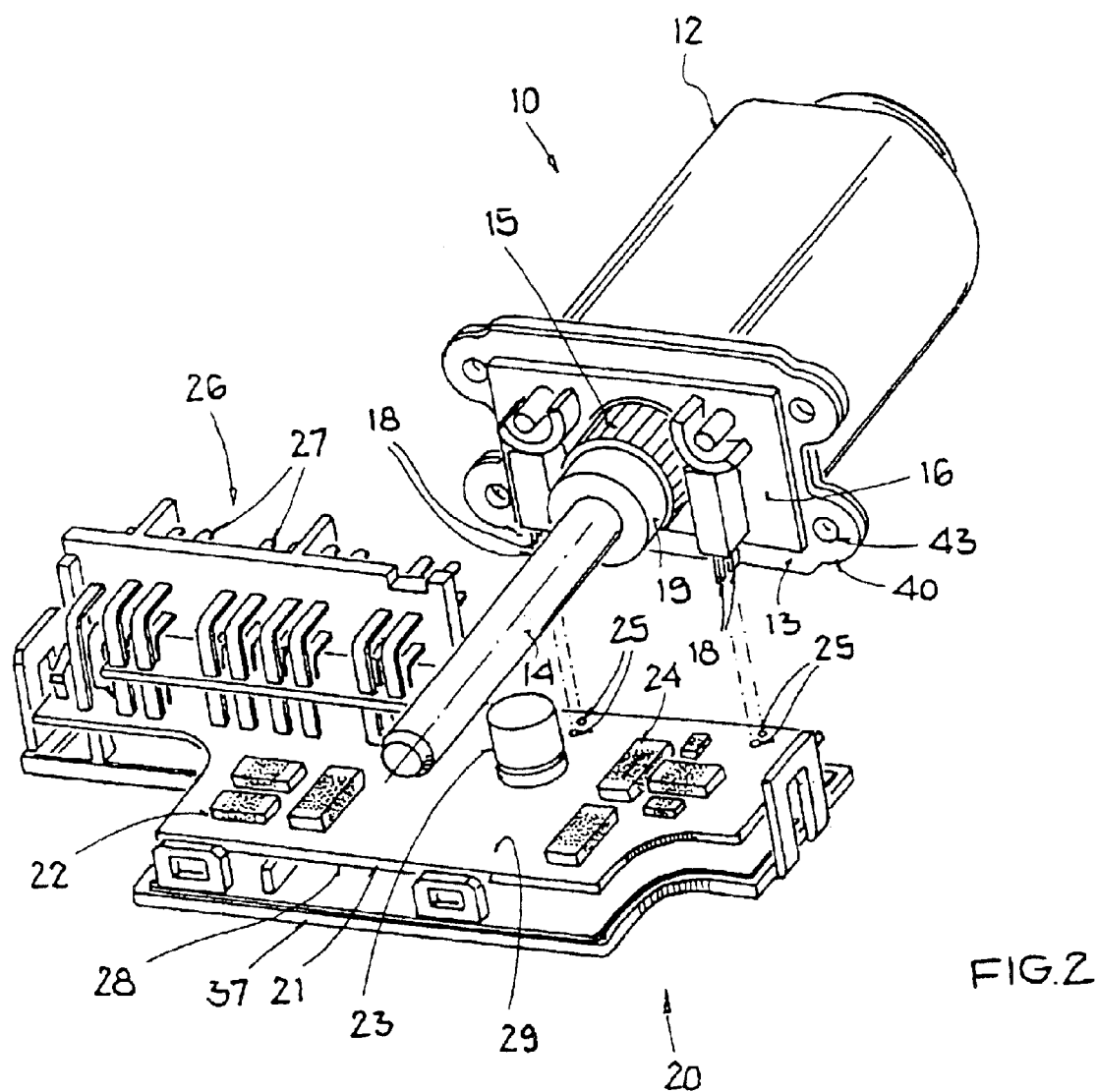
FIG. 2 shows a three-dimensional view of the electric drive unit without transmission housing.

The electric drive unit of electric motor 10, electronic module 20 and transmission 30 is, for example, integrated in a door control device of a motor vehicle for realizing the electric window lifter function.

The electric motor 10 of the electric drive unit is a direct current motor with a nominal rated power of, for example, 200 W, whereby the rotor 11 (the winding or the armature) of the electric motor 10 is enclosed by the electric motor housing 12. The electric motor 10 possesses a collector or commutator 15 (commutator ring) located on the end face 13 and connected with the working shaft 14 (drive shaft), and a brush rocker 16 arranged on the commutator 15 for contacting the commutator 15; the brush rocker 16 is embodied as a circumferential or encircling plastic ring and carries on its upper surface 17, contact elements 18 embodied as press-in contacts, for example four press-in contacts 18 are provided, of which respectively two press-in contacts are connected via an internal connecting line with the two connections of the electric motor 10. Furthermore, a ring magnet functioning as a transmitter or emitter magnet 19 is arranged on the drive shaft 14 of the electric motor 10.

The electronic module 20 of the electric drive unit is arranged on a suitable carrier body 21 (for example on a circuit board) and possesses, as functional units, for example, a power unit with power components 22 for controlling/driving the electric motor 10, and an anti-interference unit with interference suppression components 23 (for example capacitors) for suppressing the effects of the switching processes (commutation processes or brush arcing) of the electric motor 10 and for preventing external interfering influences such as EMC incident radiation, current waviness (ripples) or over-voltage conditions, etc. On the circuit board 21 there is arranged a connector part 26 with a plurality of connector plug contacts 27, onto which external connector plugs can be connected. Furthermore, a Hall sensor functioning as a rotation speed sensor 24 is provided as a SMD component, which is positioned on the circuit board 21 below the ring magnet 19 arranged on the drive shaft 14 of the electric motor 10, and which is connected with a corresponding functional unit of the electronic module 20 for evaluation of the sensor signal of the rotation speed sensor 24. The components 22, 23 of the electronic module 20 are mounted on the circuit board 21, for example, by soldering or as SMD components by means of surface mounting. Moreover, a number of contact points 25 corresponding to the number of the press-in contacts 18 on the brush rocker 16 are provided on the circuit board 21, which contact points are, for example, embodied as through-contacts in the circuit board 21; for example for increasing the current carrying capacity of the electrical connection between electric motor 10 and electronic module 20 (for example in the operation of the electric drive unit, currents up to 20 Amps can arise), four press-in contacts 18 are provided on the brush rocker 16 and consequently also four through-contacts 25 are provided in the circuit board 21 for receiving the press-in contacts 18 on the brush rocker 16.

Before the joining of electric motor 10 and electronic module 20, the drive shaft 14 of the electric motor 10, with the ring magnet 19 arranged thereon, as well as the commutator 15 of the electric motor 10 with the brush rocker 16 and the press-in contacts 18, are inserted into a first recess 32 on the front side 35 (end face side) of the transmission housing 31, which is dimensioned in such a manner so that the electric motor housing 12 lies flushly on the front side 35 (end face side) of the transmission housing 31. For sealing the electric motor 10 (electric motor housing 12) toward the transmission housing 31, a seal 40 is provided, which encompasses or surrounds the first recess 32 on the front side 35 of the transmission housing 31 in connection with the insertion of the mentioned components of the electric motor 10 into the transmission housing 31.

During the joining together of electric motor 10 and electronic module 20, the electronic module 20 is inserted from the upper side 36 of the transmission housing 31 into the transmission housing 31, whereby the connector part 26 of the electronic module 20 arranged on the upper side 29 of the circuit board 21 and contacted with the circuit board 21 is inserted in a form-fitting manner with the connector plug contacts 27 into a second recess 33 on the front side 35 of the transmission housing 31, and the circuit board 21 with the components 22, 23 arranged on its upper surface 29 is inserted flushly into the transmission housing 31 with the aid of guides applied on the inner side of the transmission housing 31; hereby the electronic module 20 is fixed in the transmission housing 31 and is positioned relative to the components of the electric motor 10 that have already been introduced there—especially the through-contacts 25 of the circuit board 21 are guided over the press-in contacts 18 on the brush rocker 16, and the circuit board 21 with the components 22, 23, 24 is positioned in a certain position relative to the underside 38 (to the floor) of the transmission housing 31 and therewith relative to the components of the electric motor 10 arranged in the transmission housing 31. The electrical connection between electric motor 10 and electronic module 20 is achieved by exerting pressure onto the underside 28 of the circuit board, and the hereby necessitated pressing-in of the press-in contacts 18 into the through-contacts 25 of the circuit board 21; this pressing-in operation is achieved, for example, by means of a bellcrank or toggle press. The mechanical fixing of the electric motor 10 and therewith also of the electronic module 20 with the transmission 30 (the transmission housing 31) is achieved by suitable securing means 41; for example by screws 41, which are guided through openings 42 on the electric motor housing 12 and openings 43 on the seal 40, and which engage into bored holes 34 on the front side 35 (end face side) on the transmission housing 31.

A housing part 37 functioning as a lid is placed onto the upper side 36 of the transmission housing 31, so that a closed transmission housing 31, which is protected against external environmental influences, is realized. Connection lines or connector plugs can be externally connected onto the connector plug contacts 27 of the connector part 26 of the electronic module 20; for example two connector plugs are provided for connection with the voltage supply (for example +12V, −12V) and a bus system (for example a CAN bus system) via a bus control line, over which, for example, the supply voltage is supplied, control signals are conducted further, and sensor signals are evaluated.

What is claimed is:

1. Electric drive unit comprising an electric motor (10), an electronic module (20), and a transmission (30), wherein a commutator (15), a brush rocker ring (16) arranged on and extending circumferentially around the commutator (15), and a drive shaft (14) of the electric motor (10), as well as a carrier body (21) of the electronic module (20) are inserted into a transmission housing (31), and wherein an electrical connection between the electric motor (10) and the electronic module (20) is achieved in the transmission housing (31) via contact elements (18) which are fixedly arranged on the brush rocker ring (16) and which releasably engage into contact points (25) fixedly provided on the carrier body (21) of the electronic module (20).

2. Electric drive unit according to claim 1, characterized in that the contact elements (18) are embodied as press-in pin contacts, which are pressed and engaged into the contact points comprising through-contacts in the carrier body (21) of the electronic module (20).

3. Electric drive unit according to claim 1, characterized in that the commutator (15), the brush rocker ring (16) arranged on the commutator (15), and the drive shaft (14) of the electric motor (10) are inserted into the transmission housing (31) via a first opening (32) in a side surface of the transmission housing (31).

4. Electric drive unit according to claim 3, characterized in that the carrier body (21) of the electronic module (20) is inserted into the transmission housing (31) via another opening at an upper side (36) of the transmission housing (31), and in that an upper surface normal axis of the carrier body (21) of the electronic module (20) extends perpendicularly to the axis of the drive shaft (14) of the electric motor (10).

5. Electric drive unit according to claim 3, characterized in that a second opening (33) is provided in the side surface of the transmission housing (31), for guiding through a connector part (26) comprising connector plug contacts (27) of the electronic module (20).

6. Electric drive unit according to claim 1, characterized in that a rotation speed sensor (24) is provided on the carrier body (21) of the electronic module (20) and is positioned directly below an emitter (19) arranged on the drive shaft (14) of the electric motor (10).

7. An electric drive unit comprising:

an electric motor including a commutator, a drive shaft extending from said commutator, a brush rocker ring that is arranged on and extends circumferentially around said commutator and that carries brushes contacting said commutator, and electrical contact elements arranged on said brush rocker ring and electrically connected to said brushes;

a transmission engaged with said drive shaft;

an electronic module including a circuit board, circuit elements arranged on said circuit board, and counterpart contacts provided on said circuit board and making electrical contact with said electrical contact elements arranged on said brush rocker ring; and a housing in which said motor, said transmission and said electronic module are received;

wherein said electrical contact elements are contact pins protruding from said brush rocker ring, said counterpart contacts are contact sockets provided on said circuit board, and said contact pins make electrical contact with said contact sockets by being respectively plugged into said contact sockets.

8. An electric drive unit comprising:

an electric motor including a commutator, a drive shaft extending from said commutator, a brush rocker ring that is arranged on and extends circumferentially around said commutator and that carries brushes contacting said commutator, and electrical contact elements arranged on said brush rocker ring and electrically connected to said brushes;

a transmission engaged with said drive shaft;

an electronic module including a circuit board, circuit elements arranged on said circuit board, and counterpart contacts provided on said circuit board and making electrical contact with said electrical contact elements arranged on said brush rocker ring; and a housing in which said motor, said transmission and said electronic module are received;

wherein said housing has first and second openings, said electric motor is inserted into said housing through said first opening, and said electronic module is inserted into said housing through said second opening.

9. An electric drive unit comprising:

an electric motor including a commutator, a drive shaft extending from said commutator, a brush rocker ring that is arranged on and extends circumferentially around said commutator and that carries brushes contacting said commutator, and electrical contact elements arranged on said brush rocker ring and electrically connected to said brushes;

a transmission engaged with said drive shaft;

an electronic module including a circuit board, circuit elements arranged on said circuit board, and counterpart contacts provided on said circuit board and making electrical contact with said electrical contact elements arranged on said brush rocker ring; and a housing in which said motor, said transmission and said electronic module are received;

wherein said electric motor including said commutator, said drive shaft, said brush rocker ring, said brushes and said electrical contact elements forms a first pre-assembled unit that is inserted into said housing, and said electronic module including said circuit board, said circuit elements, and said counterpart contacts forms a second pre-assembled unit that is inserted into said housing separately from said first pre-assembled unit.

10. An electric drive unit comprising:
- a first pre-assembled unit comprising an electric motor including a commutator, a drive shaft extending from said commutator, a brush rocker that is arranged on said commutator and that carries brushes contacting said commutator, and electrical contact elements arranged on said brush rocker ring and electrically connected to said brushes;
- a transmission;
- a second pre-assembled unit comprising an electronic module including a circuit board, circuit elements arranged on said circuit board, and counterpart contacts provided on said circuit board; and
- a housing in which said transmission, said first pre-assembled unit and said second pre-assembled unit are assembled so that said transmission engages with said drive shaft and so that said electrical contact elements of said first pre-assembled unit respectively make electrical contact with said counterpart contacts of said second pre-assembled unit.

11. The electric drive unit according to claim 10, wherein one of said electrical contact elements or said counterpart contacts comprises a respective contact pin, another of said electrical contact elements or said counterpart contacts comprises a respective contact socket, and said contact pin is plugged into said contact socket to make said electrical contact therewith when said first and second pre-assembled units are assembled in said housing.

* * * * *